No. 718,530. PATENTED JAN. 13, 1903.
W. G. SANBORN.
GROOVE CUTTING MACHINE.
APPLICATION FILED JULY 23, 1902.
NO MODEL. 2 SHEETS—SHEET 1.

Witnesses:
Wm E Griggs
E. Behel.

Inventor:
William G. Sanborn
By A. O. Behel
Atty.

No. 718,530. PATENTED JAN. 13, 1903.
W. G. SANBORN.
GROOVE CUTTING MACHINE.
APPLICATION FILED JULY 23, 1902.
NO MODEL. 2 SHEETS—SHEET 2.
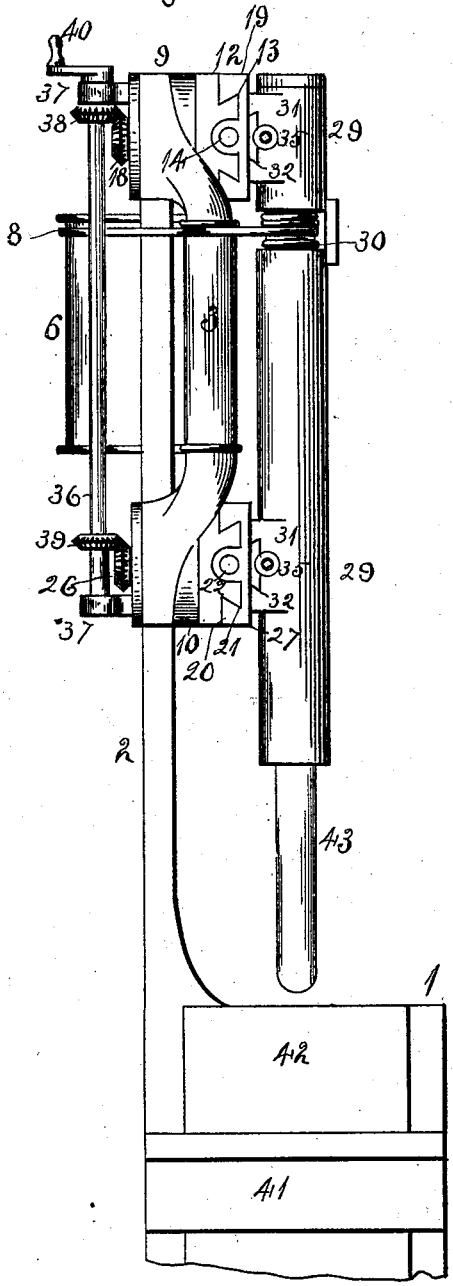
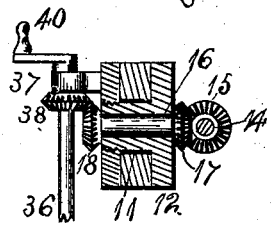
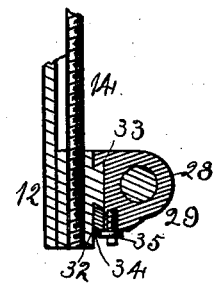
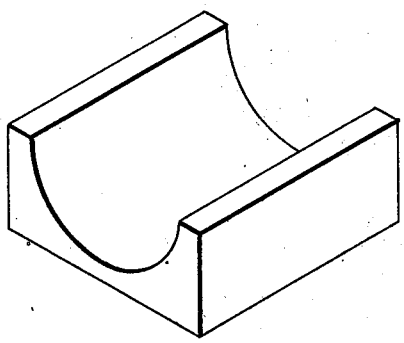
Witnesses:
Wm E Griggs
E. Behel.
Inventor:
William G. Sanborn
By A. O. Behel
Atty.
THE NORRIS PETERS CO., PHOTO-LITHO., WASHINGTON, D. C.

UNITED STATES PATENT OFFICE.

WILLIAM G. SANBORN, OF ROCKFORD, ILLINOIS.

GROOVE-CUTTING MACHINE.

SPECIFICATION forming part of Letters Patent No. 718,530, dated January 13, 1903.

Application filed July 23, 1902. Serial No. 116,752. (No model.)

*To all whom it may concern:*

Be it known that I, WILLIAM G. SANBORN, a citizen of the United States, residing at Rockford, in the county of Winnebago and State of Illinois, have invented certain new and useful Improvements in Groove-Cutting Machines, of which the following is a specification.

The object of this invention is to construct a machine for cutting grooves.

Figure 1:
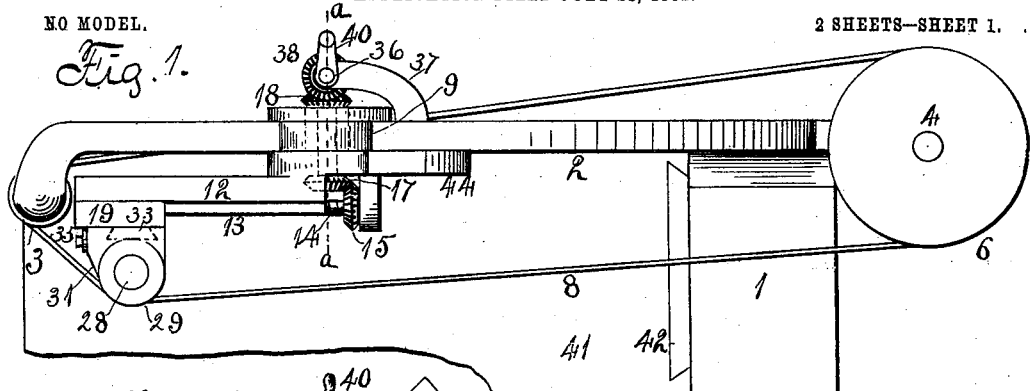
Figure 2:
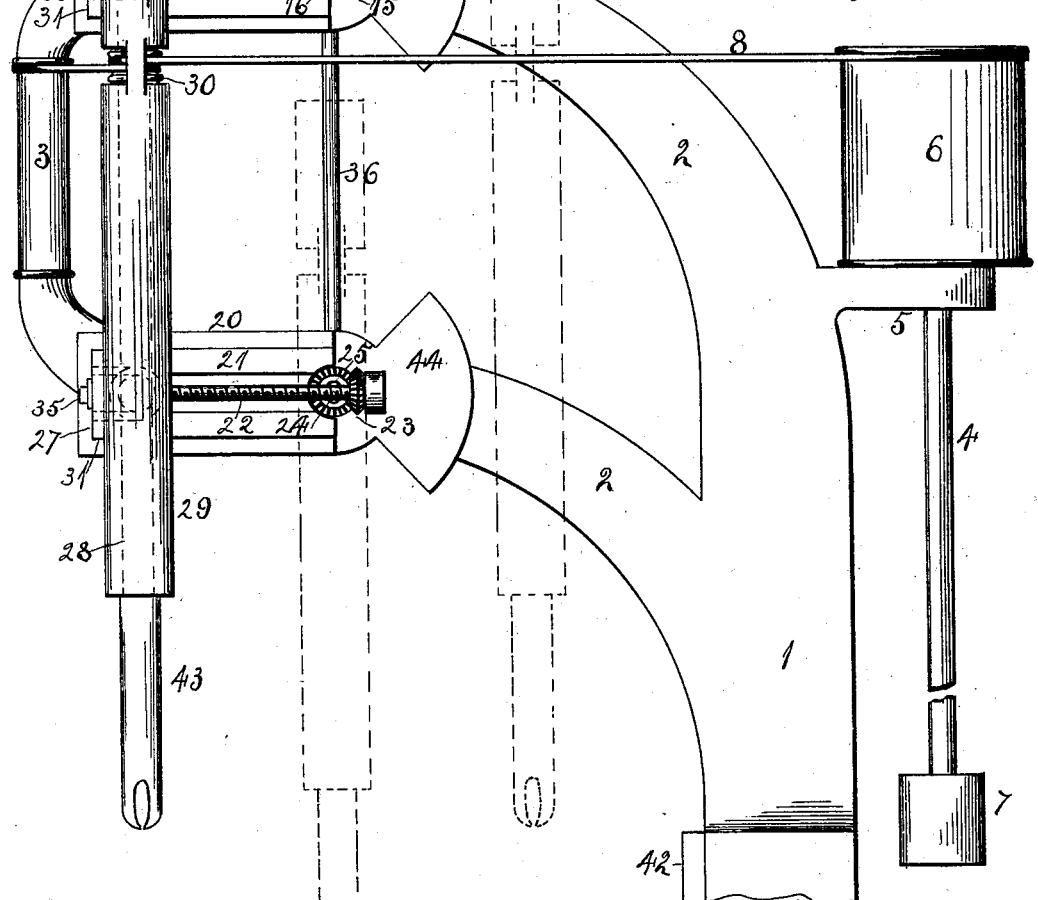

In the accompanying drawings, Figure 1 is a plan view of my improved groove-cutting machine. Fig. 2 is a side elevation. Fig. 3 is a front elevation. Fig. 4 is a section on dotted line *a*, Fig. 1. Fig. 5 is a section on dotted line *b*, Fig. 2. Fig. 6 is a perspective representation of a block, showing a groove cut by my improved machine.

The vertical standard 1 has two overhanging arms 2, supporting a vertically-arranged idler 3.

A vertical shaft 4 is supported by bearings 5 and supports a driving-pulley 7 near its lower end and a pulley 6 at its upper end. The pulleys 3 and 6 are connected by a band 8.

The overhanging arms 2 have two horizontal bearings 9 and 10, arranged in a vertical line. Within the bearing 9 is located a cylindrical support 11, having a cross-head 12 at one end. This cross-head is formed with guideways 13.

A shaft 14 is supported by the cross-head 12, having a section of its length formed with a screw, and a miter-toothed wheel 15 is secured to the other end of the shaft.

A shaft 16 extends through the opening in the cylindrical support 9 and has a miter-toothed wheel 17 secured to one end and meshes with the miter-toothed wheel 15, and to its other end is secured a miter-toothed wheel 18.

A guide 19 is fitted to the guideway 13 and has a connection with the screw-section of the shaft 14.

Within the bearing 10 is located a cylindrical support having a cross-head 20 at one end. This cross-head is formed with a guideway 21.

A shaft 22 is supported by the cross-head, having a section of its length formed with a screw, and a miter-toothed wheel 23 is secured to the other end of the shaft.

A shaft 24 extends through the opening in the cylindrical support 10 and has a miter-toothed wheel 25 secured to one end and meshes with the miter-toothed wheel 23, and to its other end is secured a miter-toothed wheel 26.

A guide 27 is fitted to the guideway 21 and has a connection with the screw-section of the shaft 22.

A vertically-arranged spindle 28 is supported in bearings 29 in a manner to be rotated by a pulley 30, connected thereto.

The bearings 29 have ends 31, each provided with a dovetailed groove 32, which receives a dovetailed center projection 33, extending from the guides 19 and 27, and a follower 34 is located on the groove and held in place by the screw 35. This arrangement forms a pivotal connection between the spindle-support and the guides in order that the spindle may always stand in a vertical position.

The band 8 encircles the pulley 30 one turn, so that greater hold may be had upon it.

A shaft 36 is supported in bearings 37 and supports two miter-toothed wheels 38 and 39. The miter-toothed wheel 38 meshes with the teeth 18, and the miter-toothed wheel 39 meshes with the miter-toothed wheel 26. A crank 40 has a connection with the upper end of the shaft 36.

A table 41 is guided by the guideway 42, extending from the face of the standard 1, and the means employed to raise and lower the table are not shown, as such are old.

The spindle 28 supports a cutter 43.

The cross-heads 12 and 20 having a pivotal connection with their bearings and connected together by the bearings supporting the spindle, the spindle can be moved in a half-circle. (Shown in the dotted lines.) By means of the crank 40 and the gear connection between the shaft 36 and the guides the guides can be moved toward the center upon which the cross-heads swing, so that the spindle 28 will describe a less semicircle. The spindle is rotated by the band 8, driven by the pulley 6.

The pulleys 3 and 6 have a face broad enough to receive the band 8 during the swinging movement of the spindle—that is, the band will be moved in the lengthwise direction of the pulleys by the pulley 30—and the swinging movement of the cross-heads carries the spindle in a segment of a circle in a vertical direction.

The material to be operated upon is held upon the table 41 in any suitable manner and moved under the cutter, which will produce a groove like that shown at Fig. 6.

The weights 44 act as counterbalances to the cross-heads and bearings supporting the spindle.

I claim as my invention—

1. In a groove-cutting machine, the combination of two arms swinging in a common plane, each having a guideway, and each supporting a block movable on the guideway, means for moving the blocks, a connection between the blocks supporting a spindle, and means for rotating the spindle.

2. In a groove-cutting machine, the combination of two arms swinging in a common plane, each having a guideway, and each supporting a block movable on the guideway, means for moving the blocks in unison, a connection between the blocks supporting a spindle, and means for rotating the spindle.

3. In a groove-cutting machine, the combination of two arms swinging in a common plane, each having a guideway, and each supporting a block movable on the guideway, each arm supporting a screw having a connection with a block, a main shaft, a gear connection between the screws and main shaft, a connection between the blocks, a spindle supported by the connection, and means for rotating the spindle.

WILLIAM G. SANBORN.

Witnesses:
A. O. BEHEL,
E. BEHEL.